United States Patent
Aoyama et al.

(10) Patent No.: US 7,611,795 B2
(45) Date of Patent: Nov. 3, 2009

(54) FUEL CELL MANUFACTURING METHOD AND FUEL CELL

(75) Inventors: Satoshi Aoyama, Susono (JP); Naoki Ito, Yokohama (JP); Hiromichi Sato, Atsugi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 126 days.

(21) Appl. No.: 10/581,394

(22) PCT Filed: Nov. 29, 2004

(86) PCT No.: PCT/JP2004/018095

§ 371 (c)(1),
(2), (4) Date: Jun. 2, 2006

(87) PCT Pub. No.: WO2005/057711

PCT Pub. Date: Jun. 23, 2005

(65) Prior Publication Data

US 2007/0082125 A1 Apr. 12, 2007

(30) Foreign Application Priority Data

Dec. 8, 2003 (JP) .................. A 2003-408486

(51) Int. Cl.
*H01M 4/86* (2006.01)
*H01M 4/00* (2006.01)
*H01M 4/02* (2006.01)
*B05D 5/12* (2006.01)

(52) U.S. Cl. .............................. 429/40; 429/30; 429/41; 429/44; 427/115

(58) Field of Classification Search .................. 429/30, 429/40; 427/115
See application file for complete search history.

(56) References Cited

U.S. PATENT DOCUMENTS

| 4,963,239 A | 10/1990 | Shimamura et al. |
| 5,415,888 A | 5/1995 | Banerjee et al. |
| 5,434,024 A | 7/1995 | Ikeda et al. |
| 5,543,239 A | 8/1996 | Virkar et al. |

(Continued)

FOREIGN PATENT DOCUMENTS

EP 0 621 648 A2 10/1994

(Continued)

*Primary Examiner*—Patrick Ryan
*Assistant Examiner*—Angela J. Martin
(74) *Attorney, Agent, or Firm*—Oliff & Berridge, PLC

(57) ABSTRACT

The manufacturing method of the invention is applied to manufacture a unit fuel cell 20, which has a hydrogen-permeable metal layer 22 of a hydrogen-permeable metal and an electrolyte layer 21 that is located on the hydrogen-permeable metal layer 22 and has proton conductivity. The method first forms the electrolyte layer 21 on the hydrogen-permeable metal layer 22, and subsequently forms an electrically conductive cathode 24 on the electrolyte layer 21 to block off an electrical connection between the cathode 24 and the hydrogen-permeable metal layer 22. The method releases Pd toward the electrolyte layer 21 in a direction substantially perpendicular to the electrolyte layer 21 to form a Pd layer as the cathode 24 that is thinner than the electrolyte layer 21. This arrangement of the invention effective prevents a potential short circuit, for example, between the cathode and the hydrogen-permeable metal layer, in the fuel cell, due to pores present in the electrolyte layer.

21 Claims, 10 Drawing Sheets

U.S. PATENT DOCUMENTS

| | | |
|---|---|---|
| 5,656,387 A | 8/1997 | Barnett et al. |
| 5,741,406 A | 4/1998 | Barnett et al. |
| 5,753,385 A | 5/1998 | Jankowski et al. |
| 6,004,696 A | 12/1999 | Barnett et al. |
| 6,066,364 A | 5/2000 | Blass et al. |
| 6,197,167 B1 | 3/2001 | Tanaka |
| 6,387,230 B1 | 5/2002 | Murphy et al. |
| 6,428,920 B1 | 8/2002 | Badding et al. |
| 6,475,249 B1 | 11/2002 | Hsu et al. |
| 6,645,656 B1 | 11/2003 | Chen et al. |
| 2002/0028367 A1 * | 3/2002 | Sammes et al. ............... 429/31 |
| 2002/0055034 A1 | 5/2002 | Fukuda et al. |
| 2003/0059658 A1 | 3/2003 | Kohler et al. |
| 2003/0091890 A1 | 5/2003 | Fukuda et al. |
| 2004/0043277 A1 | 3/2004 | Ito et al. |
| 2004/0214055 A1 | 10/2004 | Aoyama et al. |

FOREIGN PATENT DOCUMENTS

| | | |
|---|---|---|
| EP | 0621648 A2 * | 10/1994 |
| EP | 1 258 283 A1 | 11/2002 |
| JP | A 4-167710 | 6/1992 |
| JP | A-4-345762 | 12/1992 |
| JP | A 5-299105 | 11/1993 |

* cited by examiner (A) FORM ELECTROLYTE MODULE 23

(B) FORM METAL LAYER 45

(C) OXIDIZE METAL LAYER 45

(D) FORM CATHODE 24

(A) FORM ELECTROLYTE MODULE 23

(B) PACK FINE PARTICLES 47

(C) FORM CATHODE 24

(D) REMOVE FINE PARTICLES 47

(A) FORM ELECTROLYTE MODULE 23

(B) FORM PROTECTIVE LAYER 48

(C) FORM CATHODE 24

(D) REMOVE PROTECTIVE LAYER 48 AND SINTER CATHODE 24

(A)

(B)

(A)  COAT WITH ELECTRODE MATERIAL LAYER 52

(B)  FORM ELECTROLYTE MODULE 23

(C)  TRANSFER ELECTRODE MATERIAL LAYER 52

(D)  FORM CATHODE 824

FUEL CELL MANUFACTURING METHOD AND FUEL CELL

TECHNICAL FIELD

The present invention relates to a fuel cell and more specifically pertains to a fuel cell including an electrolyte layer and a hydrogen-permeable metal layer.

BACKGROUND ART

Among diversity of proposed fuel cells, there is a known fuel cell having a hydrogen-permeable palladium metal film that is formed on a proton-conductive electrolyte layer and functions as an anode. The fuel cell of this structure is manufactured by, for example, forming a film of a solid electrolyte layer, such as a ceramic layer, on a thin film of a hydrogen-permeable metal layer.

There are, however, great difficulties in forming a sufficiently thin and dense film of the solid electrolyte layer, and it is highly probable that pores in the form of micro-cracks or pinholes are present in the solid electrolyte layer. In the process of forming an electrolyte layer on a hydrogen-permeable metal layer and subsequently forming a conductive layer, such as an electrode, on the electrolyte layer, an electrode material or another electrically conductive material may enter the pores present in the electrolyte layer. Such invasion of the electrically conductive material into the pores may cause a short circuit between the conductive layer and the hydrogen-permeable metal layer and lower the performance of the resulting fuel cell.

DISCLOSURE OF THE INVENTION

The object of the invention is thus to eliminate the drawbacks of the prior art technique and to prevent a potential short circuit in a fuel cell, due to pores present in an electrolyte layer.

In order to attain at least part of the above and the other related objects, the present invention is directed to a manufacturing method of a fuel cell, which includes a hydrogen-permeable metal layer of a hydrogen-permeable metal and an electrolyte layer that is located on the hydrogen-permeable metal layer and has proton conductivity. The manufacturing method includes: forming the electrolyte layer on the hydrogen-permeable metal layer; and forming a conductive layer having electrical conductivity on the formed electrolyte layer, to block off an electrical connection between the conductive layer and the hydrogen-permeable metal layers via pores that are present in the electrolyte layer.

Even when the electrolyte layer has pores in the form of micro-cracks or pinholes, the fuel cell manufacturing method of the invention forms the conductive layer to block off an electrical connection between the conductive layer and the hydrogen-permeable metal layer. This arrangement effectively prevents a potential short circuit between the conductive layer and the hydrogen-permeable metal layer, due to the presence of the pores in the electrolyte layer, thus restraining deterioration of the performance of the resulting fuel cell.

In the fuel cell manufacturing method of the invention, the conductive layer may be an electrode. In this case, the arrangement of the invention effectively prevents a potential short circuit between the electrode and the hydrogen-permeable metal layer.

In one preferable embodiment of the fuel cell manufacturing method of the invention, the forming a conductive layer is implemented by releasing a conductive material toward the electrolyte layer in a direction substantially perpendicular to the electrolyte layer, so as to form the conductive layer that is thinner than the electrolyte layer.

The method of this embodiment makes the conductive layer formed on the electrolyte layer discrete from the conductive layer of the electrically conductive material formed inside the pores of the electrolyte layer. This arrangement blocks off an electrical connection between the conductive layer formed on the electrolyte layer and the hydrogen-permeable metal layer, thus effectively preventing a potential short circuit.

In another preferable embodiment of the fuel cell manufacturing method of the invention, the forming a conductive layer is implemented by releasing a conductive material toward the electrolyte layer at a specific angle that prevents the conductive material from being deposited on surface of the hydrogen-permeable metal layer, which is exposed on the pores present in the electrolyte layer, so as to form the conductive layer.

The method of this embodiment prevents the electrically conductive material from being deposited on the hydrogen-permeable metal layer exposed on the pores in the electrolyte layer and thus readily forms the conductive layer that is not electrically connected with the hydrogen-permeable metal layer. This arrangement thus desirably prevents potential troubles, due to a short circuit between the conductive layer and the hydrogen-permeable metal layer.

In either of the embodiments of the fuel cell manufacturing method of the invention, the forming a conductive layer may be implemented by adopting a vacuum deposition technique to form the conductive layer.

A method of releasing the electrically conductive material from a conductive material release source in one fixed direction is applicable to release the electrically conductive material at the specific angle toward the electrolyte layer. Typical examples of this method include physical vapor deposition (PVD) techniques including sputtering, ion plating, and vacuum deposition, and a thermal spraying technique. Especially preferable is the vacuum deposition technique that deposits the electrically conductive material to form the conductive layer under the condition of a higher degree of vacuum, compared with the sputtering and ion plating techniques. In the film-forming process under the high vacuum condition, particles of the released electrically conductive material hardly collide with one another but keep going straight to reach the electrolyte layer. There is accordingly little possibility that the electrically conductive material is deposited on undesirable sites of the pores. This effectively prevents a potential short circuit between the conductive layer and the hydrogen-permeable metal layer.

In still another preferable embodiment of the fuel cell manufacturing method of the invention, the forming a conductive layer includes: forming a dielectric layer in the pores present in the electrolyte layer, where the dielectric layer is mainly made of an insulating material and blocks off a connection between surface of the hydrogen-permeable metal layer, which is exposed on the pores present in the electrolyte layer, and outside of the pores; and coating the electrolyte layer and the dielectric layer formed in the pores of the electrolyte layer with the conductive layer.

The method of this embodiment forms the dielectric layer in the pores of the electrolyte layer and thereby ensures prevention of a potential short circuit between the conductive layer and the hydrogen-permeable metal layer due to the presence of the pores.

In the fuel cell manufacturing method of this embodiment, it is preferable that the step forming a dielectric layer is implemented by filling the pores of the electrolyte layer with dielectric fine particles to form the dielectric layer.

In the fuel cell manufacturing method of this embodiment, it is also preferable that the forming a dielectric layer is implemented by coating inside of the pores of the electrolyte layer with an insulating material by plating to form the dielectric layer.

In the fuel cell manufacturing method of this embodiment, it is further preferable that the forming a dielectric layer includes: coating inside of the pores of the electrolyte layer with a metal, which is oxidized to an insulating material, to form a metal coat layer; and oxidizing the metal coat layer to form the dielectric layer.

Any of these arrangements enables the dielectric layer to be formed efficiently in the pores of the electrolyte layer.

In another preferable embodiment of the fuel cell manufacturing method of the invention, the forming a conductive layer includes: filling the pores present in the electrolyte layer with fine particles; forming the conductive layer on the electrolyte layer having the pores filled with the fine particles; and removing the fine particles from the pores, subsequent to the forming the conductive layer on the electrolyte layer.

Part of the conductive layer covering over the fine particles in the pores is removed simultaneously in the process of removing the fine particles from the pores of the electrolyte layer. This arrangement further enhances the reliability of insulation between the conductive layer and the hydrogen-permeable metal layer.

In the fuel cell manufacturing method of this embodiment, the removing the fine particles may be implemented by adopting a chemical technique to remove the fine particles or a physical technique to remove the fine particles. Either of the chemical and the physical techniques removes the fine particles from the pores of the electrolyte layer and accordingly removes the electrically conductive material from the periphery of the pores, thus ensuring the reliability of insulation between the conductive layer and the hydrogen-permeable metal layer.

In still another preferable embodiment of the fuel cell manufacturing method of the invention, the forming a conductive layer includes: forming a protective layer to cover the electrolyte layer; and forming the conductive layer on the protective layer.

The protective layer is formed on the electrolyte layer, prior to formation of the conductive layer. This arrangement effectively prevents the electrically conductive material from entering the pores of the electrolyte layer in the course of formation of the conductive layer, thus desirably restraining a potential short circuit between the conductive layer and the hydrogen-permeable metal layer.

In the fuel cell manufacturing method of this embodiment, it is preferable that the step the forming a conductive layer further includes: removing the protective layer and fixing the conductive layer to the electrolyte layer.

This manufacturing method brings the conductive layer in direct contact with the electrolyte layer and gives the fuel cell with the assured insulation between the conductive layer and the hydrogen-permeable metal layer.

In the fuel cell manufacturing method of this embodiment, the protective layer may be mainly made of an insulating material having proton conductivity.

The protective layer of this structure has the similar functions to those of the electrolyte layer and makes no need for removal.

In another preferable embodiment of the fuel cell manufacturing method of the invention, the forming a conductive layer is implemented by coating the electrolyte layer with particles of an electrically conductive material having a greater particle diameter than a width of the pores present in the electrolyte layer, so as to form the conductive layer.

This arrangement desirably prevents the electrically conductive material from entering the pores of the electrolyte layer, thus effectively restraining a potential short circuit between the conductive layer and the hydrogen-permeable metal layer.

In the fuel cell manufacturing method of this embodiment, the forming a conductive layer is implemented by adopting one of arc ion plating, emulsion deposition, and cluster beam deposition techniques to coat the electrolyte layer with the electrically conductive material.

Any of these techniques is adopted to regulate the particle diameter of the electrically conductive material to be greater than the width of the pores present in the electrolyte layer.

In still another preferable embodiment of the fuel cell manufacturing method of the invention, the forming a conductive layer is implemented by applying a paste, which contains an electrically conductive material and has a predetermined level of viscosity for effectively preventing invasion of the paste into the pores present in the electrolyte layer, onto the electrolyte layer, so as to form the conductive layer.

Regulation of the viscosity of the paste containing the electrically conductive material readily prevents a potential short circuit between the conductive layer and the hydrogen-permeable metal layer.

In another preferable embodiment of the fuel cell manufacturing method of the invention, the forming a conductive layer includes: forming a conductive film of an electrically conductive material; and transferring the conductive film onto the electrolyte layer, so as to form the conductive layer.

The method of this embodiment forms the conductive film of the electrically conductive material and accordingly enhances the mutual bonding power of the particles of the electrically conductive material. This arrangement desirably prevents the electrically conductive material from entering the pores of the electrolyte layer in the process of transferring the conductive film onto the electrolyte layer, thus effectively restraining a potential short circuit between the conductive layer and the hydrogen-permeable metal layer.

The technique of the invention is not restricted to the fuel cell manufacturing method of any of the above arrangements, but is also attained by diversity of other applications including a fuel cell manufactured by the fuel cell manufacturing method of the invention.

BEST MODES OF CARRYING OUT THE INVENTION

Several modes of carrying out the invention will be explained below as preferred embodiments.

FIRST EMBODIMENT

A. Structure of Fuel Cell

Figure 1:
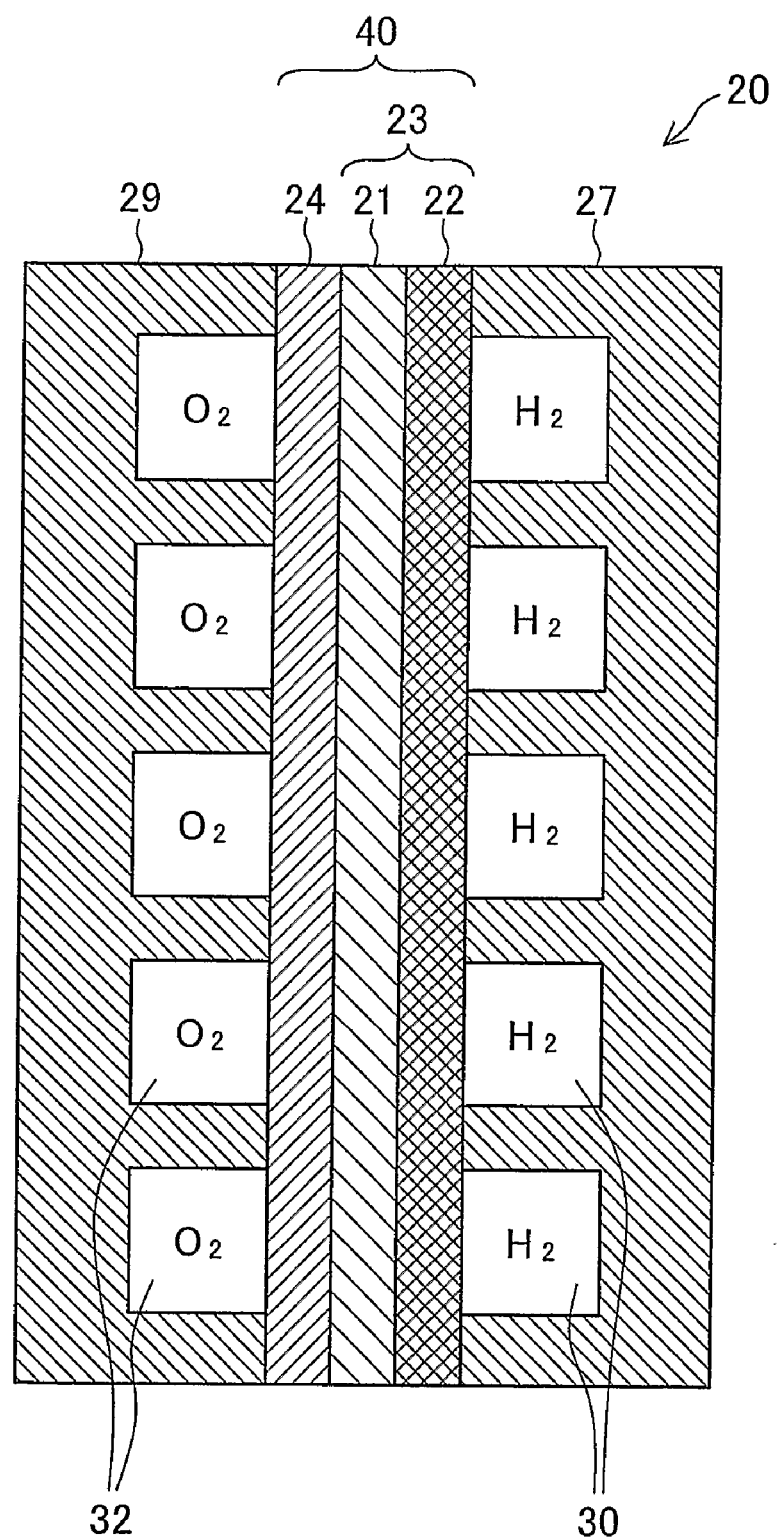
FIG. 1 is a sectional view schematically illustrating the structure of a unit fuel cell in one embodiment of the invention.

FIG. 1 is a sectional view schematically illustrating the structure of a unit fuel cell 20 as a unit of fuel cells in one embodiment of the invention. The unit fuel cell 20 has an electrolyte module 23 including a hydrogen-permeable metal layer 22 and an electrolyte layer 21, a cathode 24 formed on the electrolyte layer 21, and a pair of gas separators 27 and 29. An in-cell fuel gas conduit 30 is defined by and formed between the gas separator 27 and the hydrogen-permeable metal layer 22 to allow passage of a hydrogen-containing fuel gas. Similarly an in-cell oxidizing gas conduit 32 is defined by and formed between the gas separator 29 and the cathode 24 to allow passage of an oxygen-containing oxidizing gas. The integral body of the hydrogen-permeable metal layer 22, the electrolyte layer 21, and the cathode 24 forms an MEA (membrane electrode assembly) 40. The actually used fuel cells have a stack structure including a number of the unit fuel cells 20 shown in FIG. 1. Coolant conduits for passage of a coolant are provided between each pair of adjoining unit cells 20 or at intervals of a preset number of unit cells 20 to regulate the internal temperature of the stack structure, although not being specifically illustrated.

The hydrogen-permeable metal layer 22 is mainly made of a metal having hydrogen permeability. The metal of the hydrogen-permeable metal layer 22 may be, for example, palladium (Pd) or a Pd alloy. The hydrogen-permeable metal layer 22 may otherwise be a multi-layered membrane including a base material of a group V metal like vanadium (V), niobium (Nb), or tantalum (Ta) or a group V metal-containing alloy and a Pd or Pd-containing alloy layer formed on at least one face of the base material (on the side of the in-cell fuel gas conduit 30). Palladium that is present on at least one face of the hydrogen-permeable metal layer 22 on the side of the in-cell fuel gas conduit 30 has the activity of dissociating hydrogen molecules while the hydrogen gas is transmitted through the hydrogen-permeable metal layer 22. In the structure of this embodiment, the hydrogen-permeable metal layer 22 functions as an anode.

The electrolyte layer 21 is made of a solid electrolyte having proton conductivity. The solid electrolyte of the electrolyte layer 21 is, for example, a ceramic proton conductor of $BaCeO_3$ or $SrCeO_3$. The electrolyte layer 21 is formed on the dense hydrogen-permeable metal layer 22 and is thus sufficiently made thin to have a sufficiently reduced membrane resistance of the solid oxide. The fuel cell 20 of this structure is accordingly driven in an operating temperature range of approximately 200 to 600° C., which is significantly lower than the operating temperature range of the prior art polymer electrolyte fuel cell.

The cathode 24 is a metal layer formed on the electrolyte layer 21 and is mainly made of a noble metal having the catalyst activity of accelerating the electrochemical reaction. In the structure of this embodiment, the cathode 24 is made of Pd. When the cathode 24 is made of a hydrogen-impermeable noble metal, such as platinum (Pt), the cathode 24 should be made sufficiently thin to ensure the gas permeability between the outside of the cathode 24 (on the side of the in-cell oxidizing gas conduit 32) and the electrolyte layer 21. Formation of the cathode 24 is an essential part of the invention and is described in detail later.

The gas separators 27 and 29 are gas-impermeable members mainly made of an electrically conductive material like carbon or a metal. The gas separators 27 and 29 have specific patterned surfaces to define the in-cell fuel gas conduit 30 and the in-cell oxidizing gas conduit 32. In one possible modification of the embodiment shown in FIG. 1, the unit fuel cell 20 may additionally have an electrically-conductive, gas-permeable member interposed between the MEA 40 and each of the gas separators 27 and 29.

The fuel gas supplied to the fuel cells may be a hydrogen-rich gas obtained by reforming an adequate hydrocarbon fuel or a high-purity hydrogen gas. The oxidizing gas supplied to the fuel cells is typically the air.

B. Manufacturing Method of Fuel Cell

Figure 2:
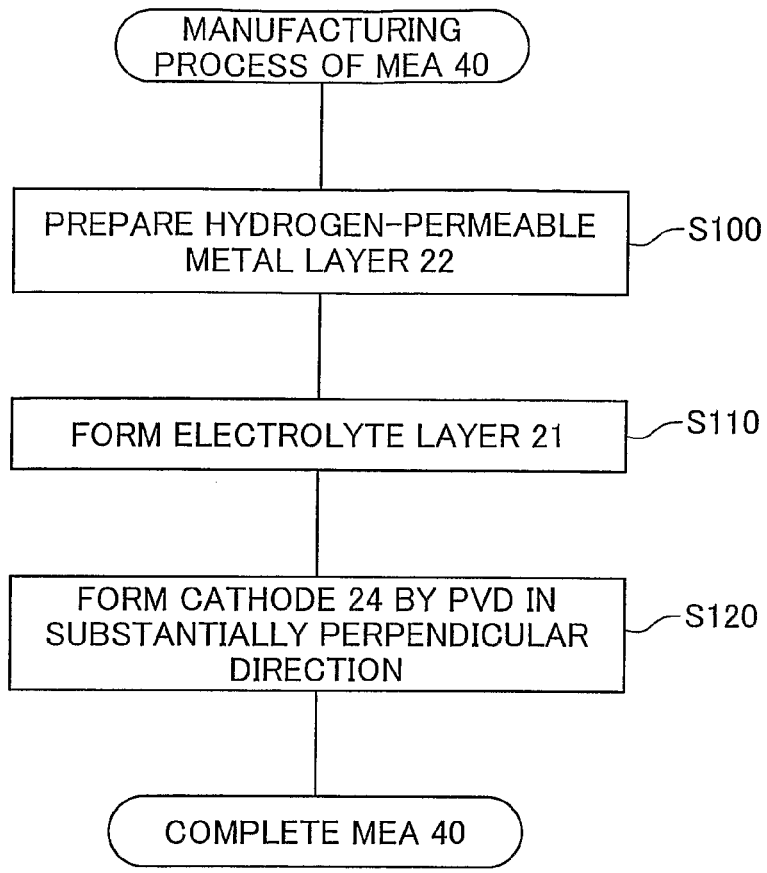
FIG. 2 is a flowchart showing a manufacturing process of an MEA in the unit fuel cell.

The following describes a process of manufacturing the MEA 40 including the hydrogen-permeable metal layer 22, the electrolyte layer 21, and the cathode 24 as part of the manufacturing method of the unit fuel cell 20. FIG. 2 is a flowchart showing the manufacturing process of the MEA 40.

The manufacturing process of the MEA 40 first prepares the hydrogen-permeable metal layer 22 (step S100). The hydrogen-permeable metal layer 22 is formed as a Pd-containing metal membrane or a multi-layered membrane having a base material of a group V metal and a Pd-containing layer formed on at least one face of the base material, as described above.

The manufacturing process subsequently forms the electrolyte layer 21 on the hydrogen-permeable metal layer 22 to complete the electrolyte module 23 (step S110). When the hydrogen-permeable metal layer 22 has the multi-layered structure including the base material of the group V metal and the Pd-containing layer formed on at least one face of the base material, the electrolyte layer 21 is formed on the other face of the group V metal-containing base material. The solid oxide is deposited on the hydrogen-permeable metal layer 22 to form the electrolyte layer 21. Any of diverse techniques including physical vapor deposition (PVD) and chemical vapor deposition (CVD) is applicable to form the film of the electrolyte layer 21. The electrolyte layer 21 has a thickness, for example, in a range of 0.1 to 5 μm.

Figure 3:
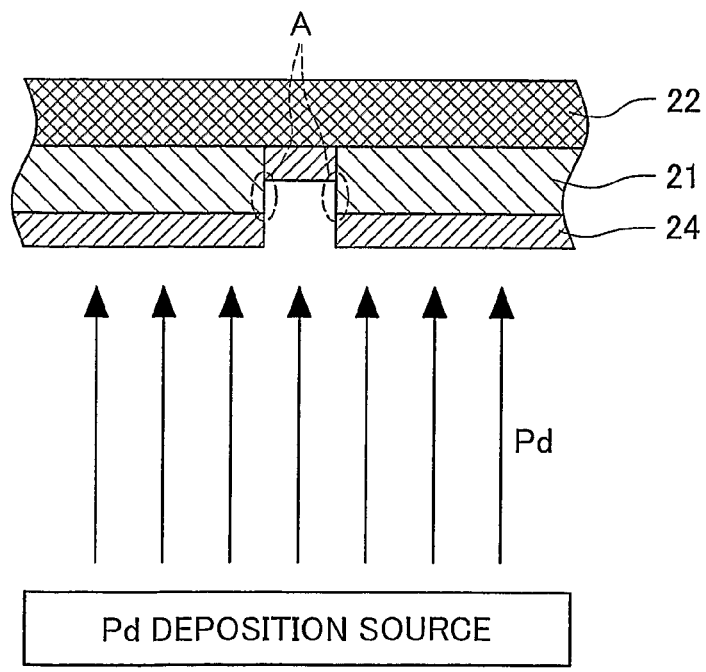
FIG. 3 shows formation of a cathode included in the MEA.

The manufacturing process then forms the cathode 24 on the electrolyte layer 21 (step S120) to complete the MEA 40. In this embodiment, the PVD technique is adopted to form the cathode 24. The concrete procedure of the PVD technique activates a Pd deposition source that releases Pd in the form of molecules or ions in one fixed direction and thereby deposits Pd onto the electrolyte layer 21 in a direction substantially perpendicular to the electrolyte module 23. The cathode 24 formed at step S120 has a less thickness than the thickness of the electrolyte layer 21 formed at step S110. The thickness of the cathode 24 is preferably not greater than 1 μm. FIG. 3 shows formation of the cathode 24. In the illustrated example of FIG. 3, the electrolyte layer 21 has pinholes or pores. As shown in FIG. 3, the surface of the electrolyte layer 21 and the inside of the pores, if any, are coated with Pd released from the Pd deposition source. The procedure of this embodiment sprays Pd onto the electrolyte layer 21 in the direction substantially perpendicular to the electrolyte module 23. Wall faces of the pores (wall faces 'A' encircled by the broken lines in FIG. 3) parallel to the Pd releasing direction are thus not coated with Pd. The Pd layer is made thinner than the electrolyte layer 21. The Pd layer formed on the electrolyte layer 21 is thus electrically and physically discrete from the Pd layers formed inside the pores (see FIG. 3).

The fuel cell assembly method locates the gas separators 27 and 29 across the MEA 40 manufactured according to the process of FIG. 2 to form each unit fuel cell 20 and lays a preset number of the unit fuel cells 20 one upon another to complete the fuel cell stack.

As described above, the manufacturing process of the MEA 40 sprays Pd onto the electrolyte layer 21 in the direction substantially perpendicular to the electrolyte layer 21 to form the cathode 24, which has a less thickness than the thickness of the electrolyte layer 21, on the electrolyte layer 21. Even when the electrolyte layer 21 has some pinholes or pores, this structure effectively prevents a potential short circuit between the cathode 24 and the hydrogen-permeable metal layer 22. The Pd layer formed on the electrolyte layer 21 is discrete from the Pd layers formed inside the pores. Such discrete arrangement blocks off an electrical connection between the cathode 24 of the Pd layer formed on the electrolyte layer 21 and the hydrogen-permeable metal layer 22.

The technique applicable to release the electrode material, such as Pd, in one fixed direction is, for example, sputtering or ion plating. More preferable is the vacuum deposition technique that deposits the electrode material to form the electrode under the condition of a higher degree of vacuum, compared with the sputtering and ion plating techniques. The vacuum deposition technique carries out electron beam heating deposition or resistance heating deposition under the high vacuum condition to form a film. Under the reduced pressure of $10^{-2}$ to $10^{-4}$ Pa, for example, the particles of the electrode material vaporized from a deposition source hardly collide with one another but keep going straight to reach the electrolyte layer 21. The vacuum deposition technique ensures the high straightness of the electrode material released from the deposition source toward the electrolyte layer 21. There is accordingly little possibility that the electrode material is deposited on the wall faces of the pores. This effectively prevents a potential short circuit between the cathode 24 and the hydrogen-permeable metal layer 22.

The procedure of this embodiment adopts the PVD technique to deposit the cathode 24, but any other suitable method but the PVD technique is alternatively applicable to deposit the electrode material onto the electrolyte layer 21 in the substantially perpendicular direction and form the cathode 24. An applicable technique other than the PVD technique is, for example, thermal spraying.

SECOND EMBODIMENT

Figure 4:
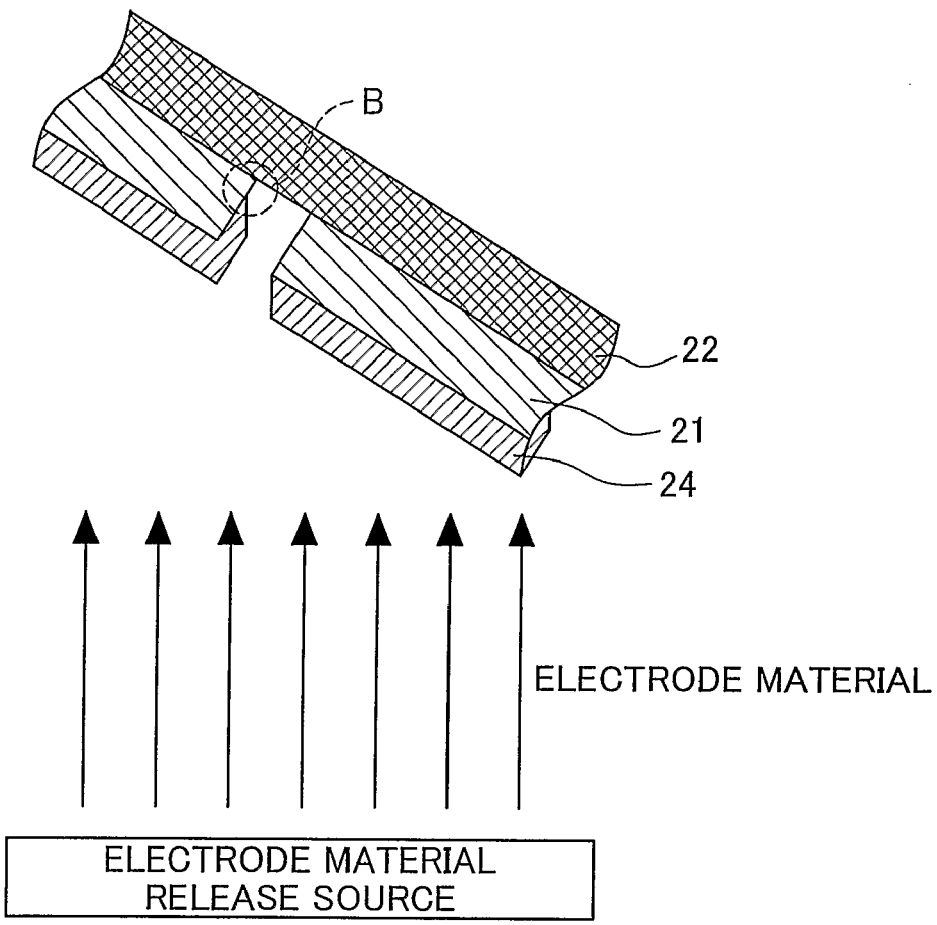
FIG. 4 schematically shows an essential part of a manufacturing process of the MEA of the fuel cell in a second embodiment of the invention.

FIG. 4 schematically shows an essential part of a manufacturing process of the MEA 40 of the fuel cell in a second embodiment of the invention. The manufacturing process of the second embodiment has a difference only in formation of the cathode 24 from the manufacturing process of the first embodiment shown in the flowchart of FIG. 2. FIG. 4 shows formation of the cathode 24 in the second embodiment. Like the first embodiment, the procedure of the second embodiment activates an electrode material release source that releases an electrode material like Pd in one fixed direction and thereby deposits the electrode material onto the electrolyte layer 21 to form the cathode 24. As shown in FIG. 4, the cathode formation step of the second embodiment corresponding to step S120 in the flowchart of FIG. 2 releases the electrode material from the electrode material release source at a specific angle to prevent the electrode material from being deposited on the surface of the hydrogen-permeable metal layer 22 exposed on the pores of the electrolyte layer 21.

This structure effectively blocks off an electrical connection between the cathode 24 and the hydrogen-permeable metal layer 22 inside the pores of the electrolyte layer 21. The release direction of the electrode material onto the electrolyte layer 21 is adjusted to ensure a non-formation area of the electrode material layer (an area 'B' encircled by the broken line in FIG. 4). Like the first embodiment, this arrangement of the second embodiment blocks off an electrical connection between the cathode 24 and the hydrogen-permeable metal layer 22 and restrains potential deterioration of the fuel cell performances due to a short circuit between the cathode 24 and the hydrogen-permeable metal layer 22. The desirable release angle of the electrode material to form the cathode 24 without causing a short circuit with the hydrogen-permeable metal layer 22 depends upon the width of the pores present in the electrolyte layer 21 (the diameter of pinholes or the width of micro-cracks) and the thickness of the electrolyte layer 21. The preferable release angle of the electrode material may be determined experimentally to sufficiently prevent a potential short circuit between the cathode 24 and the hydrogen-permeable metal layer 22 according to the conditions of the electrolyte layer 21, on which the cathode 24 is formed. One applicable procedure releases the electrode material at various angles to the electrolyte module 23 including the electrolyte layer 21 formed under preset conditions to form cathodes, applies a predetermined voltage onto resulting MEAs, and selects an adequate release angle of the electrode material to form the cathode 24 without causing a short circuit with the hydrogen-permeable metal layer 22. The release angle of the electrode material may otherwise be determined theoretically according to the width of the pores and the thickness of the electrolyte layer 21 measured with, for example, a scanning electron microscope (SEM).

Any of the diverse techniques mentioned in the first embodiment is also applicable to release the electrode material in one fixed direction for deposition in the manufacturing process of the MEA 40 in the second embodiment.

THIRD EMBODIMENT

Figure 5:
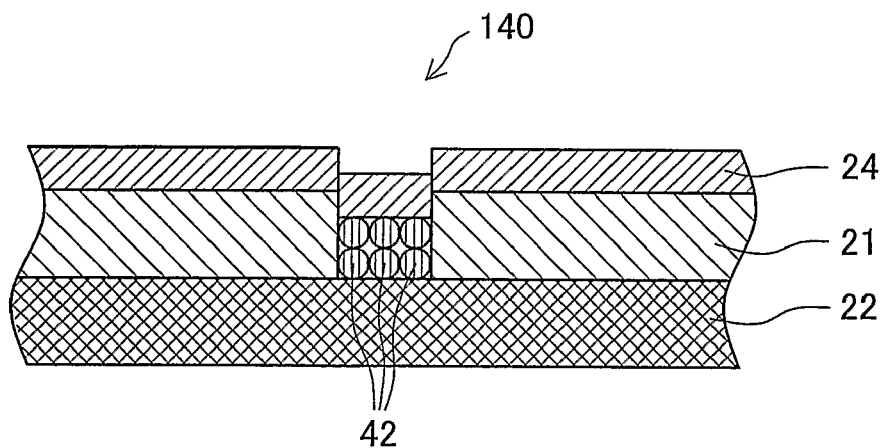
FIG. 5 is a sectional view illustrating essential part of an MEA in a third embodiment of the invention.

FIG. 5 is a sectional view illustrating essential part of an MEA 140 in a third embodiment of the invention. The MEA 140 replaces the MEA 40 in the fuel cell of the first embodiment. In the embodiments described below, the like elements to those of the MEA 40 are expressed by the like numerals. The manufacturing process of the MEA 140 forms the electrolyte module 23 in the same manner as steps S100 and S110 in the flowchart of FIG. 2 and fills the pores of the electrolyte layer 21 with dielectric particles 42, prior to formation of the cathode 24. The manufacturing process then forms the cathode 24 to cover the electrolyte layer 21 having the pores filled with the dielectric particles 42.

The dielectric particles 42 packed into the pores of the electrolyte layer 21 are, for example, aluminum oxide (alumina) particles or silicon dioxide (silica) particles. The dielectric particles 42 are required to have a smaller particle diameter than the width of the pores present in the electrolyte layer 21. The width of the pores in the electrolyte layer 21 is measured with, for example, the scanning electron microscope (SEM) as described previously. The pores of the electrolyte layer 21 are filled with the dielectric particles 42, for example, by directly spraying the dielectric particles 42 or by applying a paste of the dielectric particles 42 mixed with water or another suitable solvent onto the electrolyte layer 21. Filling the pores of the electrolyte layer 21 with the dielectric particles 42 blocks off an electrical connection between the surface of the hydrogen-permeable metal layer 22 exposed on the pores and the outside of the pores. After filling the pores with the dielectric particles 42, the manufacturing process washes the electrolyte module 23 with water for removal of the dielectric particles 42 from the surface of the electrolyte layer 21, and subsequently forms the cathode 24 on the electrolyte layer 21. Any of diverse techniques, such as PVD, CVD, or metal plating may be adopted to form the cathode 24.

In the structure of the third embodiment, the dielectric particles 42 are packed into the pores of the electrolyte layer 21 to be interposed between the cathode 24 and the hydrogen-permeable metal layer 22. The manufacturing process of the MEA 140 in the third embodiment thus effectively prevents a potential short circuit between the cathode 24 and the hydrogen-permeable metal layer 22.

FOURTH EMBODIMENT

Figure 6:
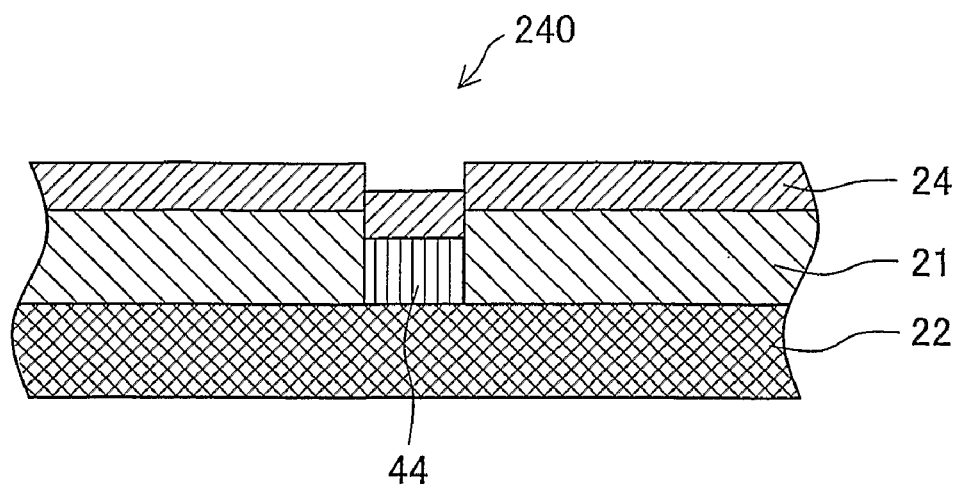
FIG. 6 is a sectional view illustrating essential part of an MEA in a fourth embodiment of the invention.

FIG. 6 is a sectional view illustrating essential part of an MEA 240 in a fourth embodiment of the invention. The MEA 240 replaces the MEA 40 in the fuel cell of the first embodiment. The manufacturing process of the MEA 240 forms the electrolyte module 23 in the same manner as steps S100 and S110 in the flowchart of FIG. 2 and coats the pores of the electrolyte layer 21 with a dielectric coat 44, prior to formation of the cathode 24. The manufacturing process then forms the cathode 24 by any adequate method, for example, PVD, CVD, or metal plating, to cover the electrolyte layer 21 having the pores coated with the dielectric coat 44. The dielectric coat 44 is formed on only one face of the electrolyte module 23 having the electrolyte layer 21 by electroplating. One applicable procedure deposits an electrolyzed insulating material, for example, a ceramic material, on one face of the electrolyte module 23 with the electrolyte layer 21. The dielectric coat 44 is thus formed selectively in the pores of the electrolyte layer 21, on which the surface of the hydrogen-permeable metal layer 22 is partly exposed, without coating the non-conductive electrolyte layer 21. The dielectric coat 44 may be made of an insulating material like alumina or silica.

Another applicable procedure coats the electrolyte layer 21 with the insulating material, such as alumina or silica, by sputtering or ion plating and subsequently etches out or otherwise removes the insulating material from the surface of the electrolyte layer 21 to form the dielectric coat 44 only in the pores of the electrolyte layer 21. After formation of the dielectric coat 44, the cathode 24 is formed on the electrolyte layer 21 in the same manner as the third embodiment.

In the structure of the fourth embodiment, the dielectric coat 44 is formed in the pores of the electrolyte layer 21 to be interposed between the cathode 24 and the hydrogen-permeable metal layer 22. The manufacturing process of the MEA 240 in the fourth embodiment thus effectively prevents a potential short circuit between the cathode 24 and the hydrogen-permeable metal layer 22.

FIFTH EMBODIMENT

Figure 7:
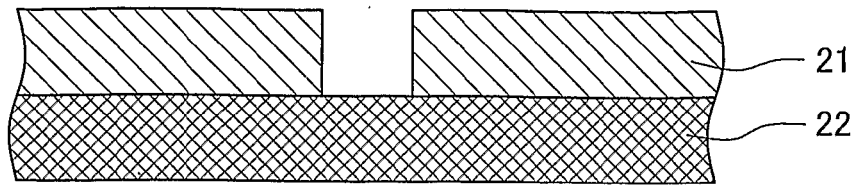
FIG. 7 shows a manufacturing process of an MEA in a fifth embodiment of the invention.
Figure 7:
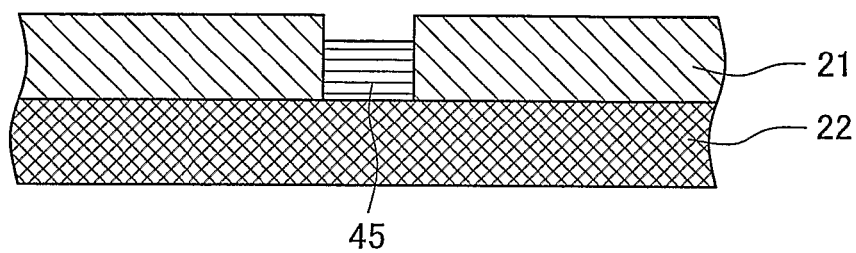
Figure 7:
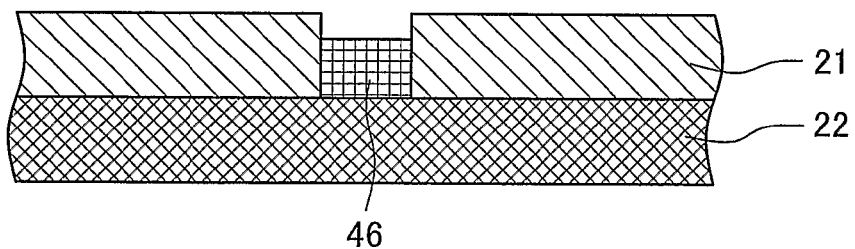
Figure 7:
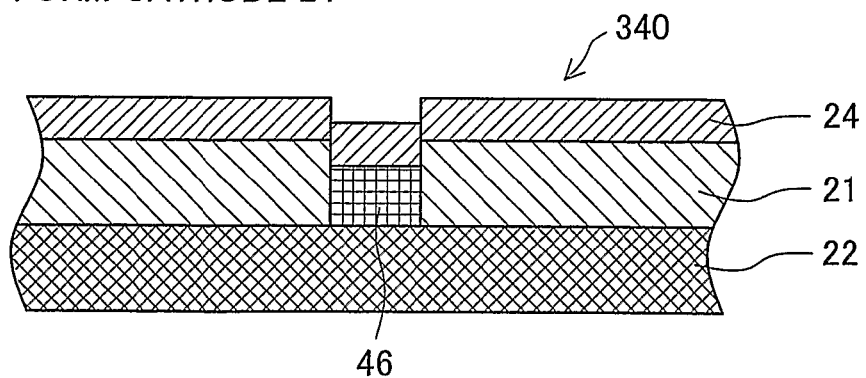

FIG. 7 shows a manufacturing process of an MEA 340 in a fifth embodiment of the invention. The manufacturing process of the MEA 340 first forms the electrolyte module 23 in the same manner as steps S100 and S110 in the flowchart of FIG. 2 (FIG. 7(A)) and then forms a metal layer 45 in the pores of the electrolyte layer 21 (FIG. 7(B)). Only one face of the electrolyte module 23 having the electrolyte layer 21 is exposed to electroplating to form the metal layer 45 selectively in the pores of the electrolyte layer 21. The metal layer 45 is made of a metal that is readily oxidized to possess the insulation properties, for example, aluminum or silicon.

The metal layer 45 is oxidized and insulated to an insulating layer 46 (FIG. 7(C)). The metal layer 45 may be oxidized by, for example, exposure to a high-temperature oxidizing atmosphere, exposure to an oxidizing solution, laser annealing in an oxidizing atmosphere, electron beam heating, or microwave heating. The metal layer 45 of aluminum or silicon is oxidized to the insulating layer 46 of aluminum oxide or silicon oxide having the insulation properties. After formation of the insulating layer 46, the manufacturing process forms the cathode 24 by any suitable method, such as PVD, CVD, or metal plating, to cover the insulating layer 46 and the electrolyte layer 21. This completes the MEA 340 (FIG. 7(D)).

In the structure of the fifth embodiment, the insulating layer 46 is formed in the pores of the electrolyte layer 21 to be interposed between the cathode 24 and the hydrogen-permeable metal layer 22. The manufacturing process of the MEA 340 in the fifth embodiment thus effectively prevents a potential short circuit between the cathode 24 and the hydrogen-permeable metal layer 22. The metal layer 45, which is oxidized to the insulating layer 46, is formed by electroplating. Even when the pores of the electrolyte layer 21 are extremely small and have a width of only several atoms, this arrangement efficiently shields the pores with the insulating layer 46 and thus effectively prevents a potential short circuit.

SIXTH EMBODIMENT

Figure 8:
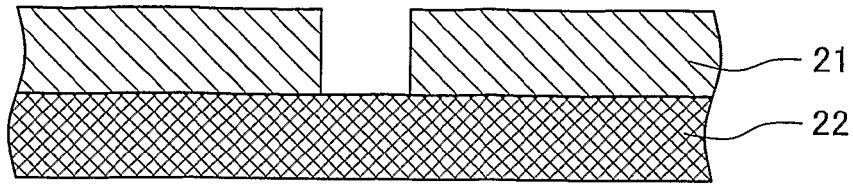
FIG. 8 shows a manufacturing process of an MEA in a sixth embodiment of the invention.
Figure 8:
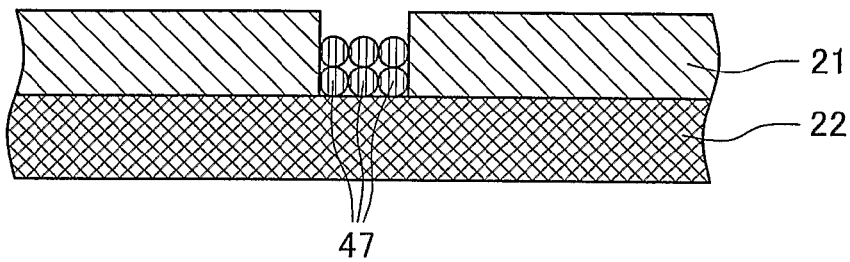
Figure 8:
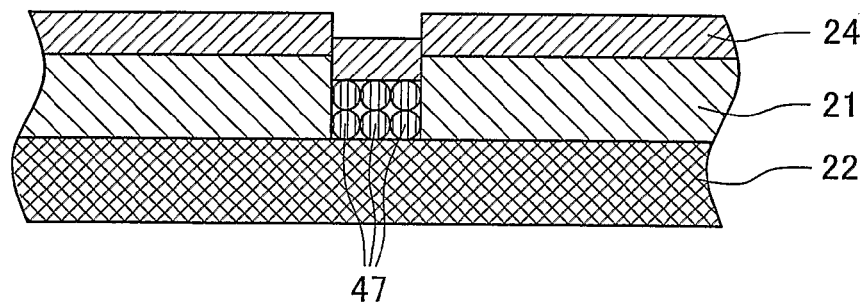
Figure 8:
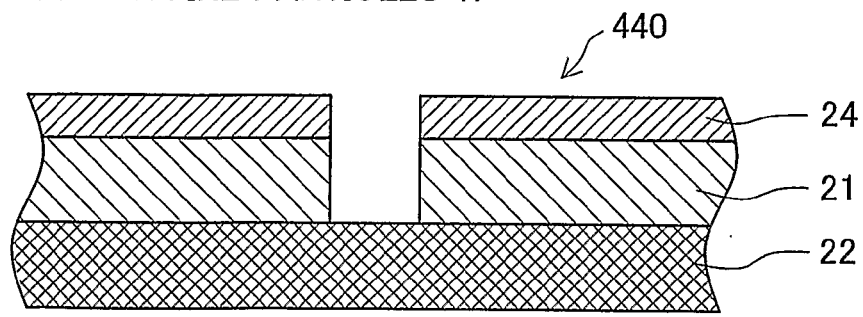

FIG. 8 shows a manufacturing process of an MEA 440 in a sixth embodiment of the invention. The manufacturing process of the MEA 440 first forms the electrolyte module 23 in the same manner as steps S100 and S110 in the flowchart of FIG. 2 (FIG. 8(A)) and then fills the pores of the electrolyte layer 21 with fine particles 47 having a smaller particle diameter than the width of the pores (FIG. 8(B)), and forms the cathode 24 by any suitable method, such as PVD, CVD, or metal plating, to cover the electrolyte layer 21 with the pores filled with the fine particles 47 (FIG. 8(C)). After formation of the cathode 24, the fine particles 47 are removed. This completes the MEA 440 (FIG. 8(D)).

The manufacturing process of the MEA 440 in the sixth embodiment fills the pores of the electrolyte layer 21 with the fine particles 47, forms the cathode 24 on the electrolyte layer 21, and then removes the fine particles 47. No electrolyte layer is thus present in the pores in the resulting MEA 440. This arrangement effectively prevents a potential short circuit between the cathode 24 and the hydrogen-permeable metal layer 22.

The manufacturing process of the sixth embodiment may adopt a chemical method to remove the fine particles 47. When the fine particles 47 are made of a selected resin, for example, an epoxy resin, an acrylic resin, or a vinyl chloride resin, one available chemical method soaks the electrolyte module 23 with the cathode 24 formed thereon in a selected solvent that is capable of dissolving the selected resin, to remove the fine particles 47. The selected solvent that is capable of dissolving the selected resin is, for example, acetone.

The manufacturing process of the sixth embodiment may otherwise adopt a physical method to remove the fine particles 47. One available physical method uses ultrasonic waves to apply vibrations onto the electrolyte module 23 with the cathode 24 formed thereon in a liquid to remove the fine particles 47. Another available physical method exposes the cathode 24 formed on the electrolyte module 23 to the air flow in a substantially perpendicular direction and utilizes this air pressure to remove the fine particles 47. Still another available physical method sprays particles having a smaller particle diameter than the width of the pores onto the cathode 24 formed on the electrolyte module 23 to remove the fine particles 47 packed in the pores. The fine particles 47 are eventually removed and may thus be electrically conductive or insulating. The fine particles 47 desirably have a small mechanical adherence to be successfully removed by the physical method and may be made of aluminum oxide.

SEVENTH EMBODIMENT

Figure 9:
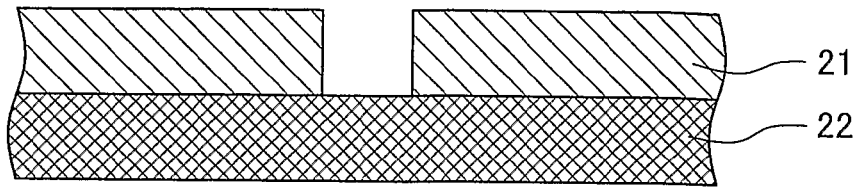
FIG. 9 shows a manufacturing process of an MEA in a seventh embodiment of the invention.
Figure 9:
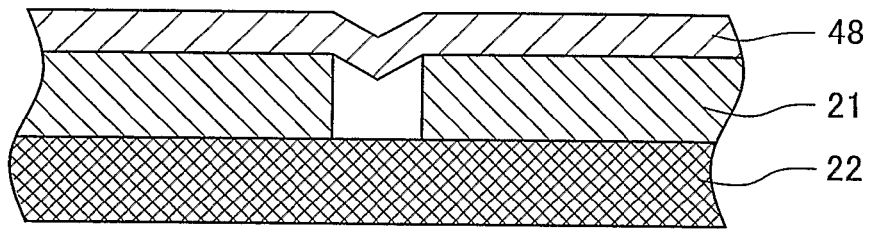
Figure 9:
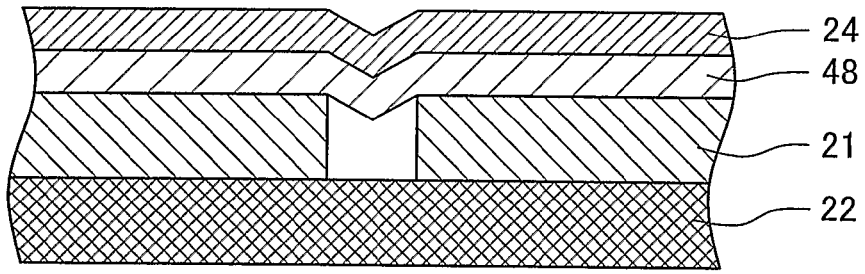
Figure 9:
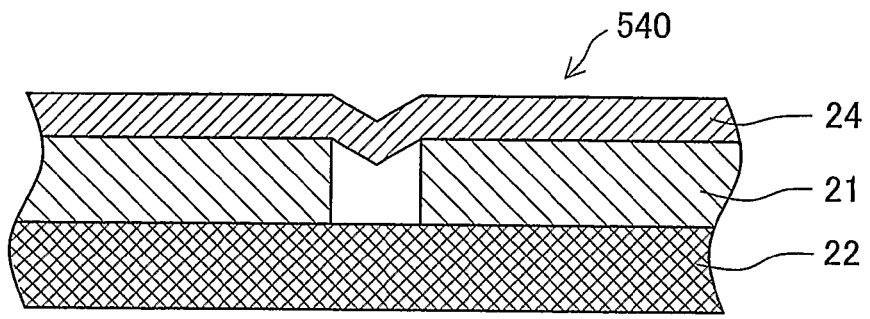

FIG. 9 shows a manufacturing process of an MEA 540 in a seventh embodiment of the invention. The manufacturing process of the MEA 540 first forms the electrolyte module 23 in the same manner as steps S100 and S110 in the flowchart of FIG. 2 (FIG. 9(A)), forms a protective layer 48 on the electrolyte layer 21 to prevent the electrode material from entering the pores (FIG. 9(B)), and forms the cathode 24 on the protective layer 48 (FIG. 9(C)). After formation of the cathode 24, the manufacturing process fires the whole layered body to remove the protective layer 48 and sinter the cathode 24 and the electrolyte layer 21 (FIG. 9(D)). This completes the MEA 540.

The protective layer 48 may be made of any material that is removable by firing or another suitable subsequent processing. For example, an organic paste of epoxy resin, acrylic resin, vinyl chloride resin may be applied to form the protective layer 48. The sufficiently heightened viscosity of the organic paste ensures effective prevention of a potential short circuit between the cathode 24 and the hydrogen-permeable metal layer 22 at the subsequent step of firing the cathode 24 on the electrolyte layer 21.

At the step of FIG. 9(C), a paste containing fine particles of an electrode material is applied onto the protective layer 48 to form the cathode 24. The electrode material may be a noble metal having catalytic activity, such as Pd or Pt. The subsequent firing step removes the protective layer 48 and gives the porous cathode 24 fixed to the electrolyte layer 21. The metal plating technique may alternatively be adopted to form a noble metal thin film having catalytic activity as the cathode 24.

In the structure of the seventh embodiment, the protective layer 48 is interposed between the electrolyte module 23 and the cathode 24. Even when the electrolyte layer 21 has pores, the manufacturing process of the MEA 540 in the seventh embodiment thus effectively prevents a potential short circuit between the cathode 24 and the hydrogen-permeable metal layer 22.

EIGHTH EMBODIMENT

The structure of the seventh embodiment has the protective layer 48, which is interposed between the cathode 24 and the electrolyte module 23 and is removed after formation of the cathode 24. The protective layer 48 may alternatively not be removed. This structure is described below as an eighth embodiment.

The manufacturing process of the eighth embodiment forms the protective layer 48 and the cathode 24 on the electrolyte module 23 in the same manner as the steps of FIGS. 9(A) through 9(C). The protective layer 48 in the structure of the eighth embodiment is made of a proton-conductive material. For example, a paste containing fine particles of the same ceramic proton conductor as that of the electrolyte layer 21 is applied onto the electrolyte module 23 to form the protective layer 48. The proton conductor of the protective layer 48 may alternatively be different from the proton conductor of the electrolyte layer 21.

After application of the paste, the manufacturing process fires the whole layered body to complete the porous protective layer 48. The cathode 24 is then formed by, for example, the metal plating technique. A modified manufacturing process may apply the paste to form the protective layer 48, apply the electrode material-containing paste to form the cathode 24, and fire the whole layered body to complete an MEA of the eighth embodiment.

In the structure of the eighth embodiment, the protective layer 48 is interposed between the electrolyte module 23 and the cathode 24. Even when the electrolyte layer 21 has pores, the manufacturing process of the MEA in the eighth embodiment thus effectively prevents a potential short circuit between the cathode 24 and the hydrogen-permeable metal layer 22. In the structure of the eighth embodiment, the protective layer 48 is not removed but is kept to more effectively restrain a potential short circuit between the cathode 24 and the hydrogen-permeable metal layer 22. The protective layer 48 in the structure of the eighth embodiment has the proton conductivity and thus functions as part of the electrolyte layer 21 in the process of power generation of the fuel cell.

NINTH EMBODIMENT

Figure 10:
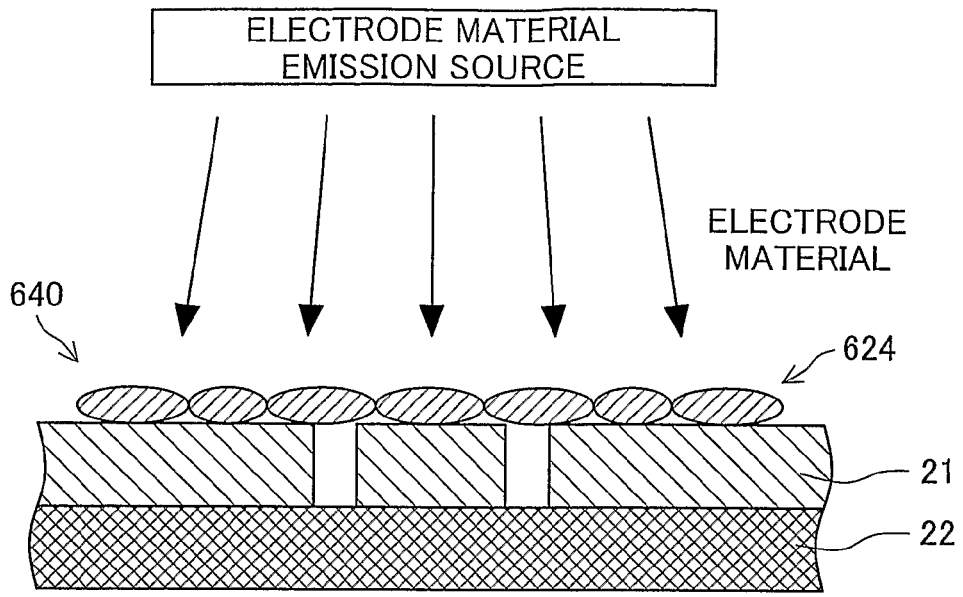
FIG. 10 shows an essential part of a manufacturing process of an MEA in a ninth embodiment of the invention.

FIG. 10 shows an essential part of a manufacturing process of an MEA 640 in a ninth embodiment of the invention. The manufacturing process of the MEA 640 first forms the electrolyte module 23 in the same manner as steps S100 and S110 in the flowchart of FIG. 2, and subsequently forms a cathode 624 on the electrolyte layer 21. The cathode 624 consists of particles having a greater particle diameter than the width of the pores present in the electrolyte layer 21. FIG. 10 shows PVD of the particles having the large particle diameter to form the cathode 624.

The techniques applicable to form the cathode 624 of the particles having the large particle diameter include, for example, arc ion plating and cluster beam deposition that produce clusters of various sizes including droplets. The arc ion plating technique generally gives particles having the particle diameter of at least several nm in a resulting film, whereas the cluster beam deposition technique generally gives particles having the particle diameter of at least several μm in a resulting film. Control of the film-forming conditions including an applied voltage level in each of these techniques regulates the particle diameter of the particles in the resulting film. The preferable procedure thus selects an adequate technique among the available film-forming techniques and sets appropriate film-forming conditions (for example, the applied voltage level) to form the cathode 624 by taking into account the width of the pores present in the electrolyte layer 21 and the cost of film formation. In the process of forming the cathode 624 by the selected technique, a Wien filter may be used to adjust the cluster size and attain a desired particle diameter of the particles in the resulting film. The manufacturing process of this embodiment regulates the particle diameter of the particles in the resulting film in a range of several nm to several μm and thus successfully forms the cathode 624 without invasion of the electrode material into the pores.

The manufacturing process of the MEA 640 in the ninth embodiment deposits the particles having the greater particle diameter than the width of the pores to form the cathode 624. This arrangement effectively prevents a potential short circuit between the cathode 624 and the hydrogen-permeable metal layer 22.

Another suitable technique but PVD may be adopted to form the cathode 624 of the particles having the greater particle diameter than the width of the pores. One applicable method provides an electrode material of a noble metal, such as Pt, in the form of fine particles having the greater particle diameter than the width of the pores and mixes the fine particles of the electrode material with a solvent that is removable by firing, for example, water, to a paste. The method applies the paste onto the electrolyte layer 21 and fires the whole layered body to remove the solvent and complete the porous cathode 624. A liquid phase method, for example, a sol-gel method or an emulsion method, may otherwise be adopted to selectively produce large-sized particles and form the cathode 624.

TENTH EMBODIMENT

Figure 11:
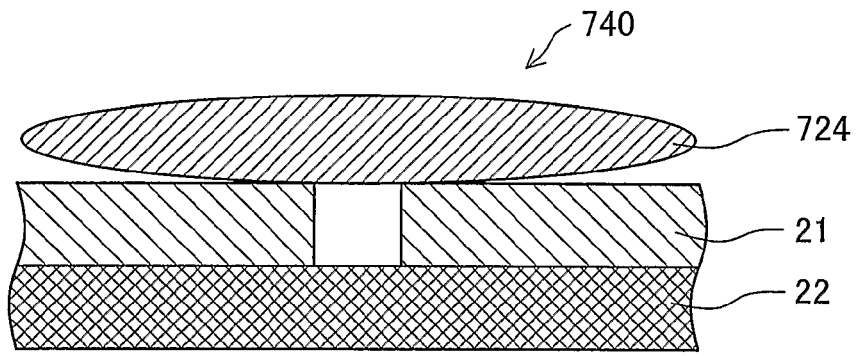
FIG. 11 shows an essential part of a manufacturing process of an MEA in a tenth embodiment of the invention.
Figure 11:
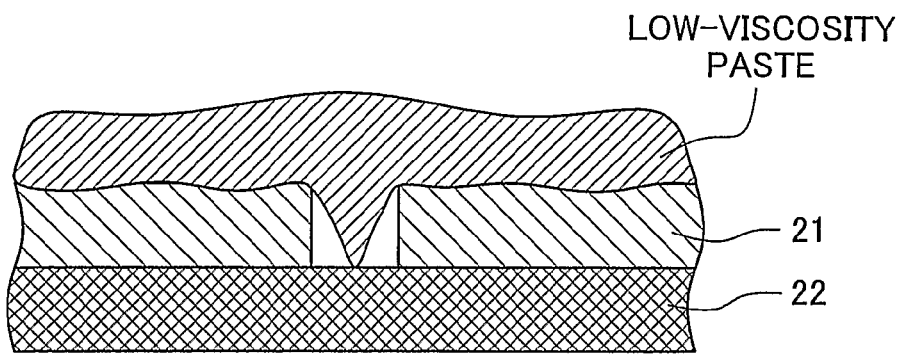

FIG. 11 shows an essential part of a manufacturing process of an MEA 740 in a tenth embodiment of the invention. The manufacturing process of the MEA 740 first forms the electrolyte module 23 in the same manner as steps S100 and S110 in the flowchart of FIG. 2, and subsequently forms a cathode 724 on the electrolyte layer 21. The manufacturing process of the tenth embodiment mixes fine particles of a noble metal, such as Pt, with a solvent that is removable by firing, for example, water, to a paste, applies the paste onto the electrolyte layer 21, and fires the whole layered body to remove the solvent and complete the porous cathode 724. The paste is prepared to have sufficiently high viscosity and thus does not invade the pores in the electrolyte layer 21 to be in contact with the hydrogen-permeable metal layer 22 when being applied to the electrolyte layer 21. The viscosity of the paste is regulated according to the composition of the paste (for example, the type of the solvent added, the content of the fine particles in the paste, the type of the noble metal of the fine particles, and the particle diameter of the noble metal fine particles) and/or the temperature of the paste. The higher temperature generally gives the lower viscosity. The desirable composition and/or the desirable temperature of the paste may be determined experimentally or otherwise to form the cathode 724 causing no short circuit with the hydrogen-permeable metal layer 22. The concrete procedure applies pastes of various compositions and/or diverse temperatures on the electrolyte module 23 to form cathodes and selects optimum conditions of the paste to form a cathode causing no short circuit. Here the electrolyte module 23 includes the electrolyte layer 21, which is prepared under preset conditions to have a predetermined thickness and pores having a width in a preset range. FIG. 11 shows application of pastes on the electrolyte layer 21. FIG. 11(A) shows application of a paste having the viscosity adjusted as discussed above. FIG. 11(B) shows application of another paste having the low viscosity, which enters the pores in the electrolyte layer 21 to be in contact with the hydrogen-permeable metal layer 22. After application of the paste, the whole layered body is fired for removal of the solvent from the paste. The applied paste layer accordingly forms the porous cathode 724.

Adequate adjustment of the viscosity of the paste effectively restrains invasion of the paste applied on the electrolyte layer 21 into the pores of the electrolyte layer 21, thus preventing a potential short circuit between the cathode 624 and the hydrogen-permeable metal layer 22. The manufacturing process of the tenth embodiment regulates the viscosity of the paste to prevent invasion of the paste into the pores and accordingly does not require selection of the noble metal particles having the particle diameter of not less than a preset level to prepare the paste, unlike the process of the ninth embodiment.

ELEVENTH EMBODIMENT

Figure 12:
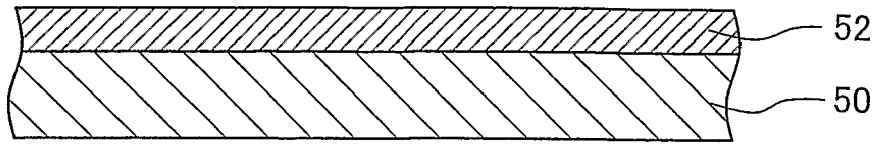
FIG. 12 shows a manufacturing process of an MEA in an eleventh embodiment of the invention.
Figure 12:
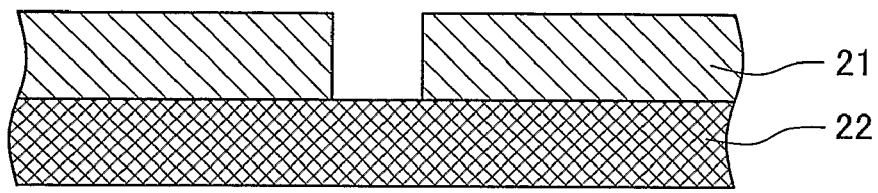
Figure 12:
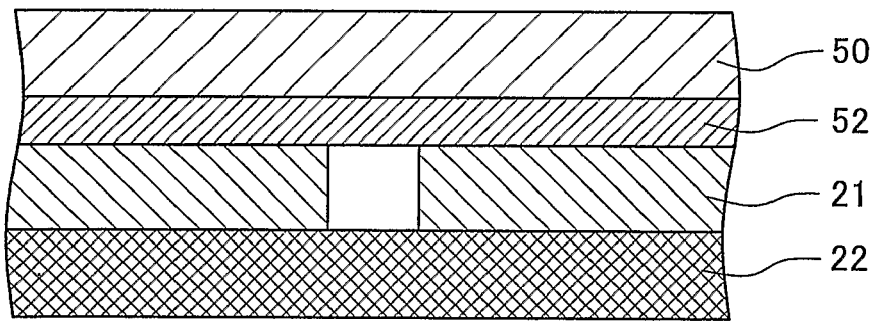
Figure 12:
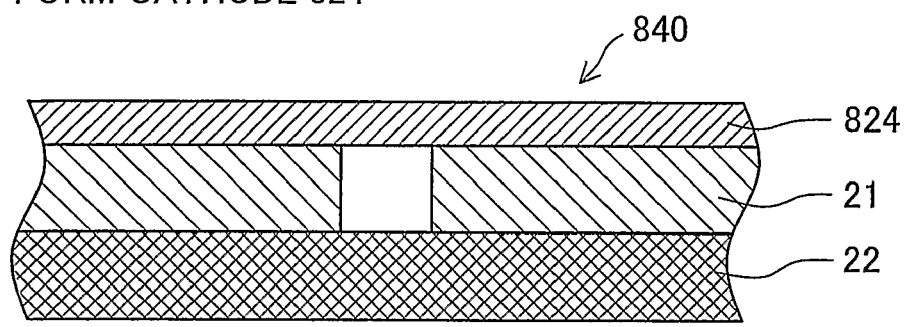

FIG. 12 shows a manufacturing process of an MEA 840 in an eleventh embodiment of the invention. The manufacturing process of the MEA 840 first coats one face of a selected transfer plate 50 with an electrode material layer 52 (FIG. 12(A)), while forming the electrolyte module 23 in the same manner as steps S100 and S110 in the flowchart of FIG. 2 (FIG. 12(B)). The manufacturing process lays the transfer plate 50 coated with the electrode material layer 52 upon the electrolyte module 23 in such a manner that the electrode material layer 52 is in contact with the electrolyte layer 21 and transfers the electrode material layer 52 onto the electrolyte layer 21 (FIG. 12(C)). This forms the cathode electrode 824 and completes the MEA 840 (FIG. 12(D)).

One face of the transfer plate 50 is coated with a thin film of a noble metal, such as Pt or Pd, by the PVD or CVD technique to form the electrode materially layer 52. The metal thin film of Pd may be a dense film or a sufficiently thin porous film. The metal thin film of a hydrogen-impermeable noble metal like Pt is a porous film. A layer of fine particles of the noble metal may alternatively be formed as the electrode material layer 52 on the transfer plate 50 by the slurry coating or screen printing technique.

The electrode material layer 52 may be transferred onto the electrolyte layer 21 by application of heat and/or pressure. The electrode material layer 52 of the metal thin film is transferred onto the electrolyte layer 21 to form the cathode 824. The electrode material layer 52 of the noble metal fine particles formed by the slurry coating or screen printing technique is, on the other hand, fired for removal of the solvent from the electrode material layer 52, prior to or subsequent to the transfer, to form the porous cathode 824.

The particles of the electrode material layer 52 are formed to a film, prior to transfer onto the electrolyte layer 21, and accordingly have enhanced mutual bonding power. The manufacturing process of the MEA 840 of the eleventh embodiment thus desirably prevents the particles of the electrode material layer 52 from entering the pores of the electrolyte layer 21 when being transferred to the electrolyte layer 21. This arrangement effectively restrains a potential short circuit between the cathode 824 and the hydrogen-permeable metal layer 22.

C. Modifications

The embodiments and their modified examples discussed above are to be considered in all aspects as illustrative and not restrictive. There may be many modifications, changes, and alterations without departing from the scope or spirit of the main characteristics of the present invention. Some examples of possible modification are given below.

(1) Any of the manufacturing processes of the respective embodiments discussed above may be combined to form the cathode. For example, any of the manufacturing processes of the ninth to the eleventh embodiments may be combined with any of the manufacturing processes of the third to the fifth embodiments. The former process regulates the size of the conductive particles to form the cathode, adjusts the viscosity of the paste to form the cathode, or forms a conductive layer on a separate plate prior to transfer of the conductive layer as the cathode, in order to prevent invasion of the electrode material into the pores. The latter process fills the pores of the electrolyte layer with insulating material, prior to formation of the cathode. Such combination of the manufacturing processes ensures more effective prevention of a potential short circuit between the cathode and the hydrogen-permeable metal layer.

(2) In the structure of the unit fuel cell 20 shown in FIG. 1, the hydrogen-permeable metal layer 22 as the base material of the electrode layer 21 functions as the anode of the fuel cell, while the noble metal layer formed on the other face of the electrolyte layer 21 functions as the cathode of the fuel cell. The anode and the cathode may be reversed according to the requirements. In this modified structure, a hydrogen-permeable metal layer of the electrolyte module functions as the cathode of the fuel cell, while a noble metal layer formed on the other face of the electrolyte layer functions as the anode of the fuel cell. This modified structure may additionally have a catalyst layer formed on the cathode of the hydrogen-permeable metal layer.

Figure 13:
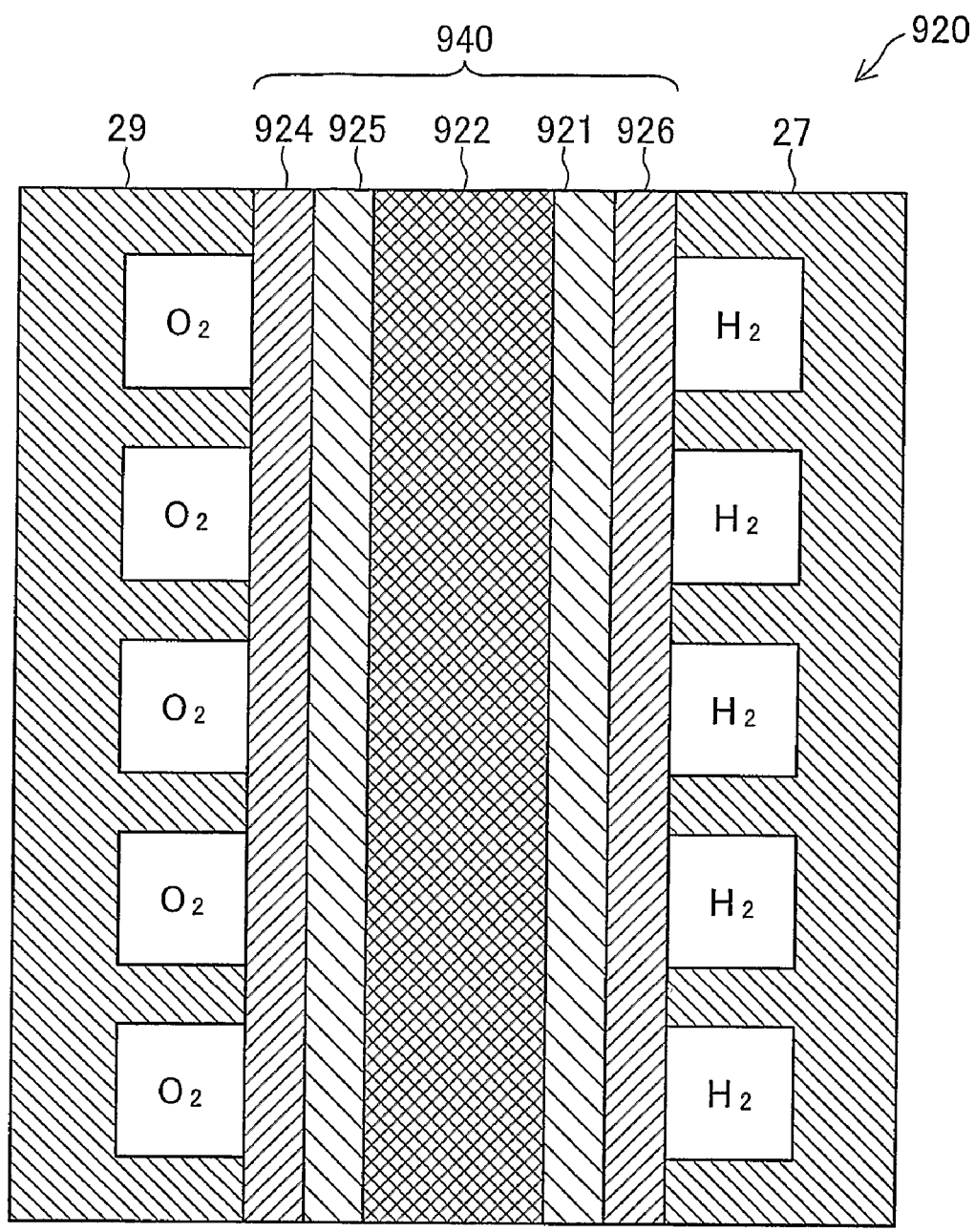
FIG. 13 is a sectional view schematically illustrating the structure of a unit fuel cell including an MEA in a modified example.

(3) In another possible modification, the electrolyte module may have multiple electrolyte layers and/or multiple hydrogen-permeable metal layers. FIG. 13 is a sectional view schematically illustrating the structure of a unit fuel cell 920 including an MEA 940 of a five-layered structure. The MEA 940 includes a base material layer 922 of a group V metal or a group V metal alloy, electrolyte layers 921 and 925 that are made of the similar solid oxide as that of the electrolyte layer 21 and are formed on both faces of the base material layer 922, and coat layers 924 and 926 that are made of Pd or a Pd alloy and are respectively arranged outside the respective electrolyte layers 921 and 925. The technique of the present invention is applicable to this structure and exerts the similar effects. After formation of the electrolyte layers 921 and 925 on both faces of the base material layer 922, any of the manufacturing processes of the first to the eleventh embodiments is adopted to form the coat layers 924 and 926 on the respective electrolyte layers 921 and 925.

The structure of FIG. 13 may further be modified in various ways. For example, either one or both of the coat layers 924 and 926 may be omitted. The modified structure without the coat layer has a catalyst layer formed on the electrolyte layer and a porous electrode layer formed on the catalyst layer to be in contact with the gas separator. Either one or both of the electrolyte layers 921 and 925 may alternatively be omitted from the structure of FIG. 13.

The above description mainly regards prevention of a potential short circuit between the electrode and the hydrogen-permeable metal layer. The technique of the present invention is also applicable to the process of formation of conductive layers that do not function as electrodes in a fuel cell having multiple conductive layers and multiple electrolyte layers. The technique effectively prevents a potential short circuit between the hydrogen-permeable metal layer as the base material of the electrolyte layers and the conductive layers formed on the electrolyte layers, due to the presence of pores in the electrolyte layers, thus restraining deterioration of the performance of the resulting fuel cell.

The invention claimed is:

1. A method of manufacturing a fuel cell having a hydrogen-permeable metal layer and an electrolyte layer disposed on the hydrogen-permeable metal layer, the method comprising:
    forming an electrolyte layer on the hydrogen-permeable metal layer, wherein the electrolyte layer has pores; and
    forming a conductive layer on the electrolyte layer such that a portion of the conductive layer formed on the electrolyte layer is discrete from a portion of the conductive layer formed inside the pores of the electrolyte layer.

2. The method of claim 1, wherein the conductive layer is an electrode.

3. The method of claim 1, wherein the forming a conductive layer is implemented by releasing a conductive material toward the electrolyte layer in a direction perpendicular to the electrolyte layer such that the conductive layer is formed thinner than the electrolyte layer.

4. The method of claim 1, wherein the forming a conductive layer is implemented by releasing a conductive material toward the electrolyte layer at an angle that prevents the conductive material from being deposited on a surface of the hydrogen-permeable metal layer, which is exposed by the pores of the electrolyte layer.

5. The method of claim 3, wherein the forming a conductive layer is implemented using a vacuum deposition technique.

6. The method of claim 1, wherein the forming the conductive layer further comprises:
    forming a dielectric layer in the pores of the electrolyte layer, wherein the dielectric layer is made primarily of an insulating material and blocks off a connection between the surface of the hydrogen-permeable metal layer, and an area outside of the pores; and
    coating the electrolyte layer and the dielectric layer with the conductive layer.

7. The method of claim 6, wherein the forming the dielectric layer is implemented by filling the pores of the electrolyte layer with dielectric fine particles to form the dielectric layer.

8. The method of claim 6, wherein the forming the dielectric layer is implemented by coating an inside of the pores of the electrolyte layer with an insulating material by plating.

9. The method of claim 6, wherein the forming the dielectric layer further comprises:
    coating the inside of the pores of the electrolyte layer with a metal, which is oxidized to an insulating material, to form a metal coat layer; and
    oxidizing the metal coat layer to form the dielectric layer.

10. The method of claim 1, wherein the forming the conductive layer further comprises:
    filling the pores of the electrolyte layer with fine particles;
    forming the conductive layer on the electrolyte layer having the pores filled with the fine particles; and
    removing the fine particles from the pores, subsequent to the forming the conductive layer on the electrolyte layer.

11. The method of claim 10, wherein the removing the fine particles is implemented using a chemical technique.

12. The method of claim 10, wherein the removing the fine particles is implemented by adopting a physical technique to remove the fine particles.

13. The method of claim 1, wherein the forming the conductive layer further comprises:
    forming a protective layer to cover the electrolyte layer; and
    forming the conductive layer on the protective layer.

14. The method of claim 13, wherein the forming the conductive layer further comprises:

removing the protective layer and fixing the conductive layer to the electrolyte layer.

15. The method of claim 13, wherein the protective layer is made primarily of an insulating material having proton conductivity.

16. The method of claim 1, wherein the forming the conductive layer is implemented by coating the electrolyte layer with particles of an electrically conductive material having a particle diameter greater than a width of the pores of the electrolyte layer.

17. The method of claim 16, wherein the forming the conductive layer is implemented using one of arc ion plating, emulsion deposition, and cluster beam deposition techniques.

18. The method of claim 1, wherein the forming the conductive layer is implemented by applying a paste onto the electrolyte layer.

19. The method of claim 1, wherein the forming the conductive layer further comprises:

forming a conductive film; and transferring the conductive film onto the electrolyte layer.

20. A fuel cell comprising a hydrogen-permeable metal layer and an electrolyte layer disposed on the hydrogen-permeable metal layer, the fuel cell being manufactured by the method of claim 1.

21. The method of claim 1, wherein the pores are through-holes.

* * * * *